Patented Mar. 31, 1925.

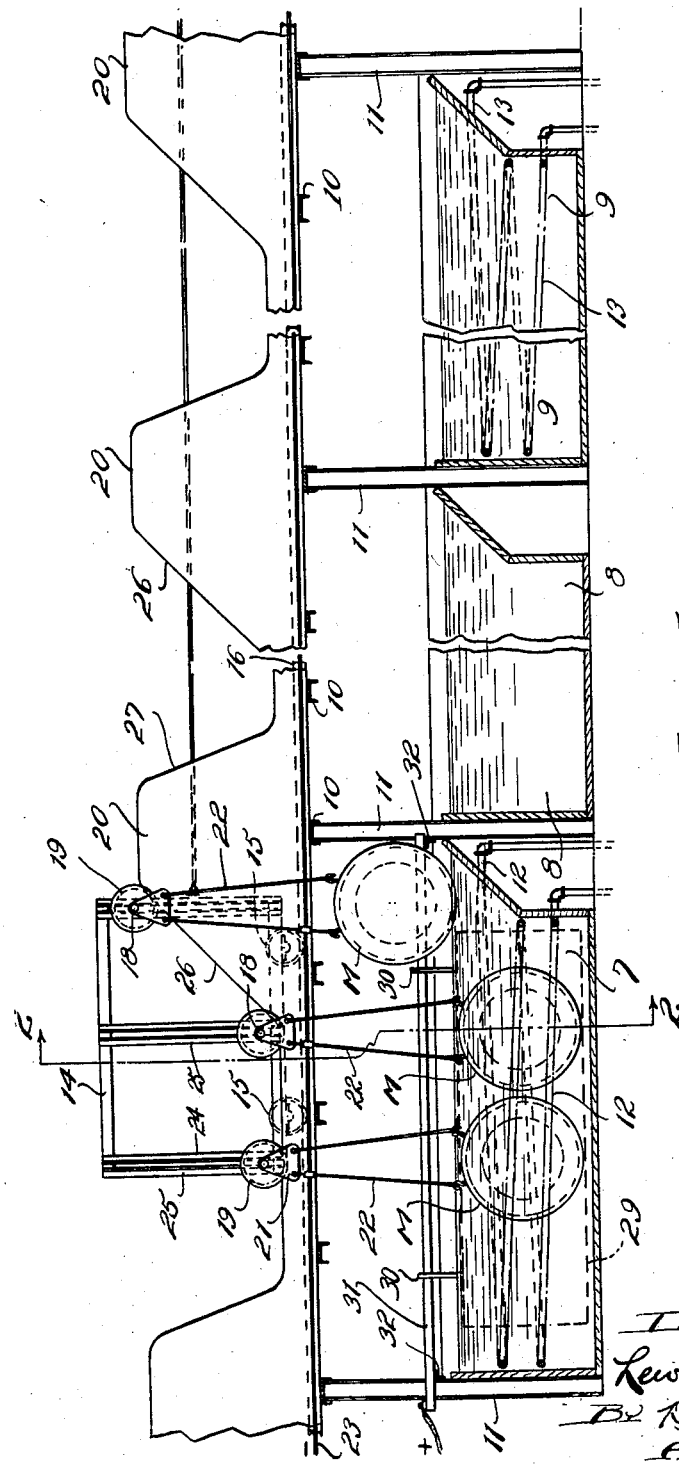

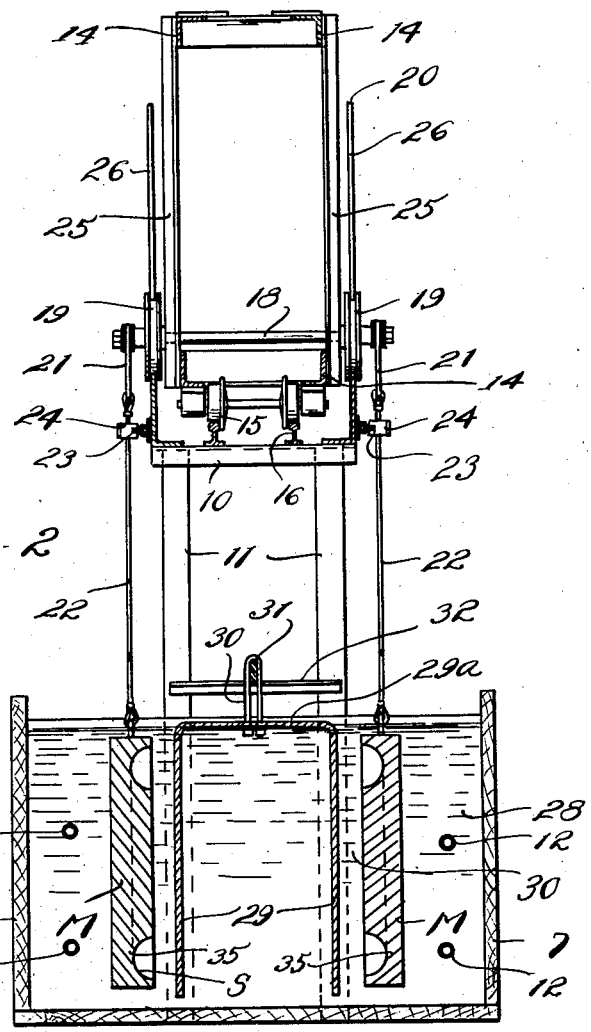

1,531,782

UNITED STATES PATENT OFFICE.

LEW L. HAMILTON, OF DETROIT, MICHIGAN, ASSIGNOR TO THE CLEVELAND TRUST COMPANY, TRUSTEE, A CORPORATION OF OHIO.

PROCESS FOR CLEANING RUBBER MOLDS.

Application filed April 13, 1923. Serial No. 631,868.

*To all whom it may concern:*

Be it known that I, LEW L. HAMILTON, a citizen of the United States, residing at Detroit, in the county of Wayne and State of Michigan, have invented a certain new and useful Improvement in Processes for Cleaning Rubber Molds, of which the following is a full, clear, and exact description, reference being had to the accompanying drawings.

In the manufacture of molded rubber articles, it has been customary to form the molds of metal, such as steel or iron, and finish the surfaces of the mold cavities by various machining methods to obtain a comparatively smooth molding surface. Such surfaces, however, have always been more or less porous and this porosity has been the cause of much difficulty during the curing and mold stripping operations due to the fact that the cured rubber articles frequently adhere to the mold walls. When the product is stripped from the molds, small particles of cured rubber are torn from the molded articles and adhere to the molds, and during subsequent curing operations, additional particles accumulate in the molds and eventually result in the molds being removed from production in order that they may be cleaned by either a burning or a sand blasting operation. To lessen this adhering of the rubber to the mold walls, lubricants in the form of foreign matter have been introduced into the molds, such as soap stone, soap bark, talc and the like. Such expedients only result in a greater and more rapid accumulation of foreign matter adhering to the mold walls.

A more recent development in the preparation of rubber molds for the curing operations includes the coating of the molding surfaces with a material which may be readily applied and which will fill all of the pores of the mold and to which the cured rubber will not adhere. Molds coated in such a manner are found to be more satisfactory in that a considerably greater number of cures may be effected with each mold so treated than with a mold which has the surfaces thereof treated only with the usual rubber mold lubricants.

It is eventually necessary, however, to remove this coating and thoroughly clean the molds and apply a new coating. This coating comprises a baked enamel which has a baking temperature higher than the curing temperature of rubber.

The general object of the present invention, therefore, is the provision of a method and apparatus for rapidly removing a rubber mold coating, and thereby removing all extraneous matter adhering thereto. More specifically, my invention is directed to the provision of a method and apparatus for electro-chemically removing a temporary mold coating or surfacing from rubber mold cavities upon which the foreign or extraneous matter has accumulated.

Other objects of my invention will hereinafter be set forth in the following description which refers to the accompany drawings. The essential characteristics are summarized in the claims.

In the drawings, Fig. 1 is a side elevation of an apparatus for carrying out my process of cleaning rubber molds; Fig. 2 is a cross sectional end elevation taken substantially along the line 2—2 of Fig. 1; Fig. 3 is an enlarged fragmentary cross section, taken through a metallic rubber mold, the cavities of which have been coated; Fig. 4 is a similar view illustrating the manner in which the coating is electro-chemically attacked and the resulting action in removing extraneous or foreign matter from the molds.

In accordance with the objects of my invention, I provide an electro-chemical process whereby extraneous matter adhering to the coated surfaces of rubber molds may be readily and thoroughly removed therefrom without necessitating the application of any physical force to this matter or without resorting to so-called burning or sand blasting operations.

I provide an apparatus for carrying out this process which, as shown in Fig. 1, may comprise a plurality of liquid containing tanks, in the present instance, a chemical retaining tank 7, a cold water cleansing tank 8 and a hot water tank 9, disposed adjacent each other, and associated with a conveyor mechanism which is adapted to lower and raise a plurality of metallic rubber molds into and out of a tank and also to convey the molds from one tank to another.

Any suitable conveyor mechanism may be used which will be serviceable in handling the various shapes of rubber molds. In the present instance, however, I show a conveyor adaptable to the handling of tire molds and which comprises a track platform 10 formed of conventional structural members, mounted upon columns 11, which may be disposed at the ends of the tanks. A conveyor car 14 may have wheels 15 moving along rails 16 supported by the platform 10. The car 14 may comprise a suitable frame for supporting a number of vertically movable shaft members 18. Upon the outer ends of these shafts are mounted roller members 19 which engage elevating cams 20, disposed at each side of the conveyor car, and which are rigidly secured to the track platform 10.

Pivotally attached to the outer end of the shaft members 18 are plate members 21 from which depend conductor cables 22, which may be secured to the top edges of mold members 10 in any suitable manner. Attached to the conveyor frame at each side thereof and adjacent to the conductor cables 22 are electrical conductor bars 23. Any suitable means, such as spring brackets 24 may be used to maintain an electrical contact between the cable members 22 and the conductor members 23, whereby a large current may pass from the members 22 to these conductor bars under a low potential. The arrangement of the bracket members 24, however, should be such that this contact will be maintained when the cable members are moved vertically by reason of a raising or lowering movement of the shaft members 18 or upon longitudinal movement of the cable members along the bars 23 when the mold members M are conveyed from one tank to another.

The shaft members 18 may be mounted upon the conveyor car 14 between frame members 24 and 25 which serve to retain the shaft members 18 against endwise displacement when the rollers 19 are acting upon the rises 26 of the cam members 20. These members, likewise, guide the shaft members 18 upon a lowering movement of the molds M when the rollers 19 are descending on the tapered portions 27 of the cams 20. It will thus be seen that provision is made for carrying pairs of matched mold members, the respective units of each pair being disposed opposite each other on each side of the conveyor.

The chemical containing tank 7 may be formed of any suitable material which will resist an electro-chemical reaction such as will be hereinafter set forth and should be of sufficient width to provide a substantial space, indicated by the reference numeral 28 to permit free movement of the mold in the solution contained by the tank.

An electric current may be introduced into the tank through an anode in the form of a U-shaped member 29 formed of a suitable metal, in the present case sheet steel positioned longitudinally of the tank. The anode may be suspended on connecting brackets 30, supported by a conductor bar 31, extending the length of the tank and suitably insulated and supported on transverse conveyor frame members 32, attached to column members 11. The lower ends of the anode 29 should terminate a sufficient distance away from the bottom of the tank to permit the accumulation of insoluble solids, such as oxides, rubber and the like, whereby the apparatus may be used during a considerable period without cleaning the tank. The width of the top connecting portion 29$^a$, of the anode 29, relative to the width of the conveyor car should be such that a space 30, in the present instance, of three or four inches in width for tire molds, is provided between the outer side face of the anode leg and the surfaces of the molds which are to be cleaned.

Having thus described a convenient apparatus for handling rubber molds, I will now set forth the electro-chemical reactions which take place in the tank 7, when acting upon a rubber mold having the cavity surfaces thereof treated in the manner disclosed in the patent application referred to. In cross section in Fig. 3, a surfacing or coating C, which is applied to the machined cavity surface S of the metallic mold 35, is shown. Fig. 3 is a greatly enlarged representation of the thickness of the coating over the actual coating thickness when a coating is applied to the mold in practice.

The coating C may comprise a baked enamel which is applied to the mold surfaces and which fills all the minute pores and interstices thereof as well as to cover any oxides which may be formed thereon, whereby the molding surface of the coating presents an extraordinarily smooth contact to the rubber when placed in the mold cavities, during the curing operation. Repeated curing operations, however, results in an accumulation of minute particles of cured rubber, cement and sulphur oxides, which adhere to the exposed surfaces of the coating C, as indicated at 38.

By my process, I effect an extraordinary saving in the time required for the cleaning or removing of the extraneous matter from the molds in that I do not attack this foreign matter chemically but dissolve the coating which is disposed between it and the metallic surface S of the mold, I find that the coating may be dissolved away and cause a parting of this foreign matter from the mold surfaces in the manner illustrated in Fig. 4. It will be noted in this figure of the drawings that the coating which was disposed between the foreign matter 38 and the metallic mold surface S, has been completely dissolved away and the particle 38, having no further means of adherence to the mold drops from the mold wall. The foreign matter 36 is shown with the coating almost completley dissolved away while the foreign matter 37 is shown with the coating dissolved away with sufficient of the coating remaining, however, that the extraneous matter 37 remains in adhering relation to the mold walls. Further electrochemical action on the remaining portion of the coating will cause the separation of this particle from the mold surface.

This dissolving action may be effected by the use of a caustic solution, the dissolving and detergent action of which may be accelerated upon the mold by using the mold as the cathode in the manner described when passing a low potential high amperage electric current through the caustic solution in the tank 7. The caustic solution is preferably maintained at a temperature approaching the boiling point of water and I accordingly provide steam coils 12 which may be disposed adjacent the side walls of the tank 7. Steam coils 13 may also be provided in the third tank 9 whereby a hot water bath may be applied to the cleaned molds to remove any of the cleaning chemical which may be on the mold after the mold has been submersed in the cold water rinsing tank 8.

In find that a commercial soda ash and sodium cyanide when mixed in the proportions of two to one in a concentrated aqueous solution will give the desired ionic reaction. Commercial soda ash which comprises sodium hydroxide and sodium carbonate, when in an electrically charged aqueous solution is converted into sodium hydroxide. This action is greatly expedited by the use of the sodium cyanide whereby the sodium ion of the cyanide chemically units with the basic ion of the water thus forming more sodium hydroxide. The displaced hydrogen ion thus unites with the cyanide ion forming hydrogen cyanide or hydrocyanic acid. Satisfactory results will be obtained by the use of an electric current of a magnitude approximating 600 amperes under a potential of 5 or 6 volts. Any of the aqueously soluble cyanide salts may be used, such as potassium cyanide, for the purpose specified.

It is to be understood that the novelty of my process is primarily founded in the idea of removing the extraneous or foreign matter from the mold surfaces by the use of an electro-chemical process, and particularly by dissolving an intermediate temporary coating which is applied to the mold walls prior to the accumulation of foreign matter on the mold wall.

What I claim is:—

1. The process of cleaning rubber molds which includes the steps of submerging a mold in a caustic solution, placing a metallic anode in the solution adjacent the surfaces of the mold which is to be cleaned, and electrically connecting the mold whereby the mold becomes a cathode and subjecting the anode to a low potential, high amperage charge, whereby the caustic action of the solution upon the mold surfaces is greatly accelerated.

2. The process of cleaning rubber molds which includes the steps of preparing a cleaning solution comprising an aqueous mixture of commercial soda ash and sodium cyanide, placing a metallic anode in the solution, submerging the mold in the solution with the mold surface thereof to be cleaned disposed adjacent said anode, connecting the mold to the negative side of a low potential electric line, connecting the anode to the positive side thereof and subjecting the solution to a low voltage, high amperage electrical charge, whereby the detergent action of the caustic solution is accelerated.

3. The process of removing extraneous matter from a temporarily surfaced rubber mold which includes the steps of removing the temporary surface which is disposed between the metallic surface of the mold and said extraneous matter and thereby cause the extraneous matter to become detached from the mold.

4. The process of cleaning temporarily surfaced rubber molds which includes the steps of preparing an aqueous caustic solution, increasing the electrical conductivity of the caustic solution by the introduction of a soluble cyanide salt, placing a metallic anode in the solution, submerging the rubber molds to be cleaned in the solution and connecting the mold whereby the mold becomes a cathode and subjecting the solution to a low potential, high amperage electrical charge, whereby the caustic activity of the solution is increased.

5. The process of cleaning a coated rubber mold of the character described which includes the steps of submerging the mold in a caustic solution which includes a dissolved cyanide salt and with the surfaces to be cleaned disposed adjacent a metallic anode submerged in the solution, electrically connecting the mold as a cathode, and subjecting the solution to an electrical charge whereby the electro-chemical activity of the solution will cause the coating disposed between the extraneous matter to be cleaned from the mold and the metallic surfaces of the mold to be dissolved by the caustic action of said solution.

6. The process of removing extraneous matter from the cavity of rubber molds which have the cavity surfaces thereof coated with a baked enamel which includes the steps of submerging the mold in a caustic solution, electrically connecting the mold as a cathode and positioning a metallic anode adjacent said surfaces to be cleaned and subjecting the solution to an electrical charge, whereby the enamel coating is attacked by the caustic solution and is dissolved, thereby removing the intermediate medium between the extraneous matter to be removed from the mold and the metallic surfaces of the mold.

7. In the process of molding rubber articles, the combination of steps which include the molding and curing of the rubber in molds having coated surfaces whereby the rubber is prevented from direct contact with the metallic surfaces of the mold and the extraneous particles of rubber and cement are maintained out of contact with the metallic surfaces of the mold by said coating and removing accumulations of said extraneous particles in a cleaning process, which dissolves the coating between the metallic surfaces of the mold and said accumulation of extraneous matter.

8. The process of cleaning coated rubber molds which includes the steps of submerging the mold in an aqueous caustic solution, electrically connecting the mold as a cathode while in the solution, positioning an anode adjacent the surfaces of the mold to be cleaned, passing an electric current through the solution from the anode to the cathode while maintaining the said solution at a temperature above normal, removing the mold from said solution, dipping the mold in cold water bath and finally subjecting the mold to a hot water bath.

9. The process of cleaning rubber molds having enameled surfaces which includes the steps of submerging the mold in a caustic solution and passing an electric current through the solution while using the mold as a cathode.

10. The process of cleaning rubber molds having the molding surfaces thereof coated with a baked enamel which includes the steps of submerging the mold in a caustic cyanide solution and passing a current through the solution to the mold while using the mold as a cathode whereby the said dissolving action of the caustic solution upon the baked enamel coating is accelerated and the foreign matter which it is desired to remove from the mold may be removed from the mold when its means of adherence, namely the enamel coating is dissolved by the electro-chemical action.

11. The process of cleaning rubber molds which includes the steps of submerging the molds in a caustic solution having a metallic anode submerged therein and electrically connecting the molds whereby the mold becomes the cathodes and subjecting the molds to an electric charge.

12. The process of cleaning rubber molds which includes the steps of preparing a cleaning solution comprising an aqueous mixture of commercial soda ash, and an aqueously soluble cyanide salt, submerging the mold in the solution with the mold surface thereof to be cleaned disposed adjacent an electric anode and electrically connecting the mold to comprise a cathode and subjecting the solution to a low voltage, high amperage electrical charge, whereby the detergent action of the caustic solution is accelerated.

13. The process of cleaning a coated rubber mold of the character described which includes the steps of submerging the mold in a caustic solution, with the surfaces to be cleaned disposed adjacent a metallic anode submerged in the solution, electrically connecting the mold as a cathode, and subjecting the solution to an electrical charge whereby the electro-chemical activity of the solution will cause the coating disposed between the extraneous matter to be cleaned from the mold and the metallic surfaces of the mold to be dissolved by the caustic action of said solution.

14. The process of removing extraneous matter from the cavity of rubber molds which have the cavity surfaces thereof coated with a baked enamel which includes the steps of submerging the mold in a caustic solution, electrically connecting the mold as a cathode and subjecting the solution to an electrical charge, whereby the enamel coating is attacked by the caustic solution and is dissolved and thereby removing the intermediate medium between the extraneous matter to be removed from the mold and the metallic surfaces of the mold.

15. The process of cleaning coated rubber molds which includes the steps of submerging the mold in an aqueous caustic solution, electrically connecting the mold as a cathode in the solution, passing an electric current through the solution while using the mold as a cathode while maintaining the said solution at a temperature above normal, removing the mold from said solution, dipping the mold in cold water rinsing bath and finally subjecting the mold to a hot water bath to remove all traces of the cleaning chemical.

16. The process of cleaning rubber molds having the enameled surfaces which includes the steps of submerging the mold in a heated caustic solution and passing an electric current through the solution while using the mold as a cathode.

17. The process of cleaning rubber molds which includes the steps of submerging the mold in a caustic cyanide solution and passing a current through the solution to the mold while using the mold as a cathode.

In testimony whereof, I hereunto affix my signature.

LEW L. HAMILTON.